(12) United States Patent
Hayasaka

(10) Patent No.: US 10,255,026 B2
(45) Date of Patent: Apr. 9, 2019

(54) AUDIO APPARATUS AND AUDIO SYSTEM

(71) Applicant: TEAC CORPORATION, Tokyo (JP)

(72) Inventor: Kaname Hayasaka, Saitama-ken (JP)

(73) Assignee: TEAC CORPORATION, Tokyo (JP)

( * ) Notice: Subject to any disclaimer, the term of this patent is extended or adjusted under 35 U.S.C. 154(b) by 0 days.

(21) Appl. No.: 15/463,838

(22) Filed: Mar. 20, 2017

(65) Prior Publication Data
US 2017/0277505 A1     Sep. 28, 2017

(30) Foreign Application Priority Data
Mar. 24, 2016   (JP) ................... 2016-059539

(51) Int. Cl.
G06F 3/16     (2006.01)
G11B 27/031   (2006.01)

(52) U.S. Cl.
CPC ............. *G06F 3/162* (2013.01); *G06F 3/165* (2013.01); *G11B 27/031* (2013.01)

(58) Field of Classification Search
CPC ............ H04N 21/2187; H04L 65/4069; H04L 65/4076
USPC ............................................. 381/81, 80, 123
See application file for complete search history.

(56) References Cited

U.S. PATENT DOCUMENTS

| 5,168,481 | A * | 12/1992 | Culbertson ............ G11B 19/00 369/2 |
| 7,277,766 | B1 | 10/2007 | Khan et al. |
| 8,300,836 | B2 | 10/2012 | Pu et al. |
| 8,464,045 | B2 | 6/2013 | Hendsbee et al. |
| 2005/0055202 | A1 | 3/2005 | Kunito et al. |
| 2008/0109643 | A1 | 5/2008 | Nishida |
| 2009/0019307 | A1 * | 1/2009 | Kwon .................... H04L 1/004 714/16 |
| 2009/0138109 | A1 | 5/2009 | Park |

(Continued)

FOREIGN PATENT DOCUMENTS

| EP | 1102272 A2 * | 5/2001 | ........... G11B 27/034 |
| JP | 2005-045738 A | 2/2005 | |

(Continued)

OTHER PUBLICATIONS

British Office Action, dated Sep. 18, 2017, for British Application No. GB1704621.0, 8 pages.

(Continued)

*Primary Examiner* — Alexander Jamal
(74) *Attorney, Agent, or Firm* — Seed IP Law Group LLP

(57) ABSTRACT

An apparatus and a system are provided in which a user can easily check that an appropriate audio file is assigned to an immediate output switch. The system includes a PC connected to a communication line, and an audio interface apparatus connected to the PC and having an immediate output switch for outputting, to the PC and in response to a user operation, a reproduction start instruction signal of an audio file which is assigned in advance. The PC judges whether or not assignment is normal when the audio file is assigned by a user operation, and supplies a judgment result to the audio interface apparatus. The audio interface apparatus receives the judgment result, and notifies, to the user and prior to a user operation, the judgment result in association with the immediate output switch.

7 Claims, 6 Drawing Sheets

(56) References Cited

U.S. PATENT DOCUMENTS

| | | | | |
|---|---|---|---|---|
| 2009/0171486 A1* | 7/2009 | Lindsay, Jr. | ........... | G11B 25/00 |
| | | | | 700/94 |
| 2009/0213938 A1* | 8/2009 | Lee | ........... | H04N 19/70 |
| | | | | 375/240.24 |
| 2011/0249955 A1* | 10/2011 | Ito | ........... | G11B 27/031 |
| | | | | 386/241 |
| 2016/0011923 A1* | 1/2016 | Walker | ........... | H04L 65/80 |
| | | | | 714/49 |
| 2016/0019877 A1* | 1/2016 | Remignanti | ........... | G10H 1/0066 |
| | | | | 84/645 |
| 2016/0021164 A1 | 1/2016 | Chakarapani et al. | | |

FOREIGN PATENT DOCUMENTS

| | | | |
|---|---|---|---|
| JP | 2006-065223 A | 3/2006 | |
| KR | 10-0546874 B1 | 1/2006 | |
| WO | 2008/035431 A1 | 3/2008 | |

OTHER PUBLICATIONS

"MP3Test," archived Feb. 20, 2016, URL=https://web.archive.org/web/20160220000636/http://www.shivi.de/MP3Test-EN.html, download date Oct. 5, 2017, 3 pages.

"MP3 Scan + Repair App," URL=http://triq.net/mac/mp3-scan-repair, download date Oct. 5, 2017, 4 pages.

Serato, "Serato DJ 1.8 Software Manual," Oct. 29, 2015, pp. 1-79.

* cited by examiner

AUDIO APPARATUS AND AUDIO SYSTEM

CROSS REFERENCE TO RELATED APPLICATION

The entire disclosure of Japanese Patent Application No. 2016-059539 filed on Mar. 24, 2016, including the specification, claims, drawings, and abstract, is incorporated herein by reference in its entirety.

TECHNICAL FIELD

The present disclosure relates to an audio apparatus and an audio system.

BACKGROUND

In the related art, various sound reproduction apparatuses are proposed.

WO 2008/035431 A discloses a sound reproduction apparatus in which a plurality of sound data and assignment data are stored in a USB memory, and the assignment data and a switch are associated with each other so that sound data corresponding to an operated switch are captured from the USB memory. This reference also discloses that the association operation of the sound data with the plurality of switches displayed on a display is done by a drag-and-drop operation, and assignment data for associating the sound data to the switch are transferred to the USB memory.

JP 2006-065223 A discloses a sound source reproduction apparatus in which each of a plurality of tact switches is correlated to sound source data stored in a memory, and an associated program is executed according to an operated tact switch, to reproduce and output the sound source data.

JP 2005-045738 A discloses a call apparatus using the Internet which enables transmission and reception of BGM and sound effects in addition to a call voice, and describes that a sound volume of the BGM and the sound effects is set adjustable so as to optimize the sound volume level during synthesis with the call voice and the sound volume level when transmitting a hold sound by a hold button operation.

There is proposed a technique in which an audio interface apparatus and a computer are connected, various audio signals are captured from the audio interface and supplied to the computer, and are suitably edited or the like and recorded on the computer or output to the outside via the Internet (Internet live broadcasting).

In such an audio system, desirably, an audio file to be reproduced and output is assigned in advance to a sound reproduction switch provided on the audio interface apparatus (the switch will hereinafter referred to as an "immediate output" or "PON" switch), and the assigned audio file is desirably immediately reproduced and output upon operation of the immediate output switch. For assigning the audio file to the immediate output switch in advance, for example, a scheme may be considered in which a virtual immediate output switch corresponding to the physical immediate output switch of the audio interface apparatus is displayed on the computer, and the audio file is assigned by dragging-and-dropping the audio file to the virtual immediate output switch.

However, a problem occurs in that, in principle, even when an inappropriate file (a file other than the audio file) is erroneously assigned to the immediate output switch, it is not possible to notice that the file is inappropriate until the immediate output switch is actually operated. Even when an appropriate file (audio file) is assigned to the immediate output switch, if the data of the file are in an abnormal state such as when the data are damaged, and the audio cannot be reproduced, similar problem would occur.

SUMMARY

An advantage of the present disclosure lies in the provision of an apparatus and a system in which a user can easily check that an appropriate audio file is assigned to the immediate output switch.

According to one aspect of the present disclosure, there is provided an audio apparatus that can be connected to a computer, the audio apparatus comprising: an operation switch that outputs, to a computer and in response to a user operation, a reproduction start instruction signal of an audio file which is assigned in advance; a receiver that receives, from the computer, a result of judgment, executed by the computer, of whether or not the audio file which is assigned in advance is normal; and a processor that notifies, to the user and prior to a user operation, a judgment result in association with the operation switch based on the judgment result received by the receiver.

According to another aspect of the present disclosure, the processor notifies the judgment result as a change of a display form including at least one of a display color and a display brightness of the operation switch.

According to another aspect of the present disclosure, the judgment result includes at least two states of normal and no assignment, and the processor displays the at least two states of normal and no assignment in an identifiable manner.

According to another aspect of the present disclosure, the audio apparatus further comprises an on-air switch that outputs, to the computer and in response to a user operation, a switching signal for determining whether or not the audio file is to be output on-air, and that outputs, to the computer, a reproduction start instruction signal of an audio file which is assigned in advance when the audio file is not to be output on-air, wherein the receiver receives, from the computer, a result of judgment, executed by the computer, of whether or not the audio file which is assigned in advance is normal, and the processor notifies, to the user and prior to a user operation, the judgment result in association with the on-air switch based on the judgment result received by the receiver.

According to another aspect of the present disclosure, there is provided an audio system comprising: a computer that is connected to a communication line; and an audio apparatus that is connected to the computer and that comprises an operation switch that outputs, to the computer and in response to a user operation, a reproduction start instruction signal of an audio file which is assigned in advance, wherein the computer comprises a display; and a first processor that displays, on the display, a virtual switch corresponding to the operation switch, that judges whether or not assignment is normal when an audio file is assigned to the virtual switch by a user operation, that displays a judgment result in association with the virtual switch, and that supplies the judgment result to the audio apparatus, and the audio apparatus comprises: a receiver that receives the judgment result supplied from the first processor; and a second processor that notifies, to the user and prior to a user operation, the judgment result in association with the operation switch based on the judgment result received by the receiver.

According to another aspect of the present disclosure, the second processor notifies the judgment result as a change of a display form including at least one of a display color and a display brightness of the operation switch.

According to another aspect of the present disclosure, the judgment result includes at least two states of normal and no assignment, and the second processor displays the at least two states of normal and no assignment in an identifiable manner.

According to various aspects of the present disclosure, a user can easily check, prior to an actual operation of an operation switch (immediate output switch), that an appropriate audio file is assigned to the immediate output switch.

BRIEF DESCRIPTION OF DRAWINGS

Embodiment(s) of the present disclosure will be described by reference to the following figures, wherein.

DESCRIPTION OF EMBODIMENTS

Structure

An embodiment of the present disclosure will now be described with reference to the drawings.

Figure 1:
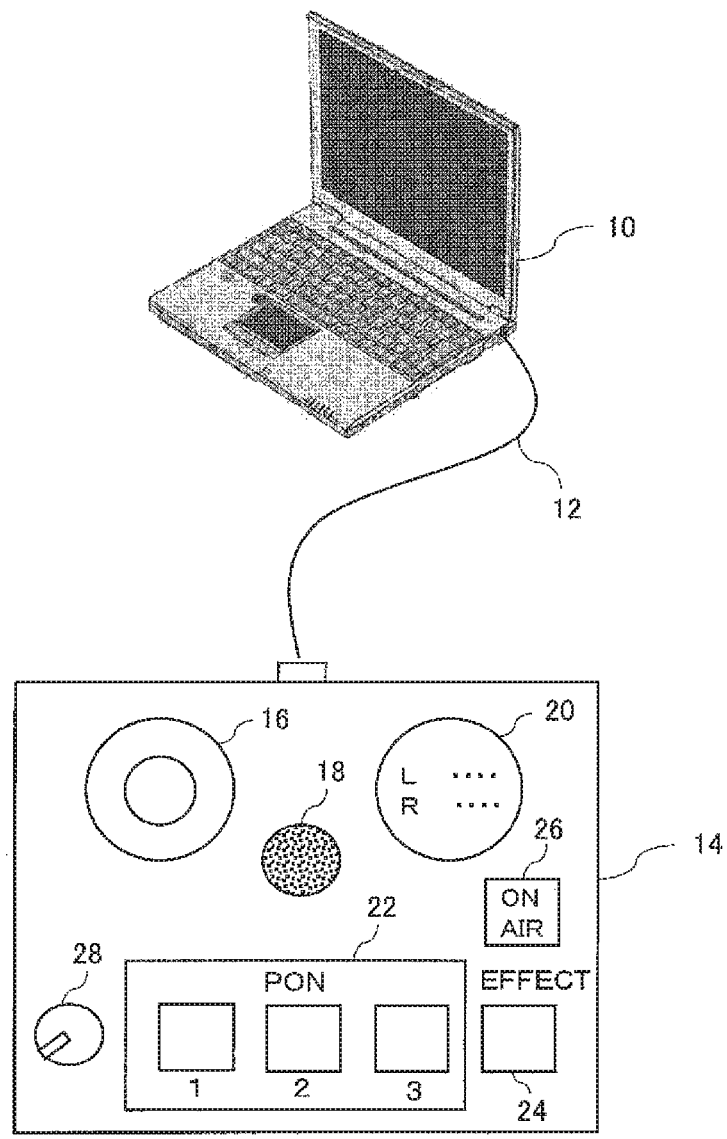
FIG. 1 is a system structural diagram of an embodiment of the present disclosure.

FIG. 1 is a structural diagram of a system of the present embodiment. An audio system according to the present embodiment comprises a personal computer (PC) 10 and an audio interface apparatus 14, and the PC 10 and the audio interface apparatus 14 are connected to each other, for example, by a USB cable 12, in a manner to allow transmission and reception of data.

On the PC 10, software for inputting, editing, and outputting audio data are installed, and the input/output and editing of the audio data are executed using the software.

The audio interface apparatus 14 includes an amplifier and an analog input terminal and an analog output terminal of a plurality of channels, and transmits and receives audio signals and various control signals to and from the PC 10. The audio interface apparatus 14 further includes a microphone input terminal 16, a built-in microphone 18, a level meter 20, and a headphone output adjustment button 28, and also includes an immediate output switch 22 including a plurality of buttons, an effect switch 24 for producing various sound effects, and an on-air switch 26.

The immediate output switch 22 includes three immediate output switches, including "immediate output 1," "immediate output 2," and "immediate output 3." When the user operates the immediate output switch 22, the audio interface apparatus 14 supplies a reproduction output instruction signal to the PC 10, and the PC 10 reproduces and outputs an audio signal in response to the reproduction output instruction signal. When the PC 10 is connected to the Internet and the audio signal reproduced by the PC 10 can be output to the outside via the Internet (Internet live broadcasting), the audio signal is reproduced and output to the Internet by the user operating the immediate output switch 22 in a state where the on-air switch 26 is set to an ON state. To the three switches of the immediate output switch 22; that is, the "immediate output 1," the "immediate output 2," and the "immediate output 3," desired audio files may be assigned in advance, and the user can control the PC 10 to reproduce and output the audio file which is assigned in advance by operating one of the three immediate output switches, the "immediate output 1," the "immediate output 2," and the "immediate output 3." The assignment of the audio file to the immediate output switch 22 will be described later in detail.

The effect switch 24 is a switch for adding a predetermined sound effect to the audio signal. The predetermined sound effect may be arbitrary, and the process may be, for example, a process to add a reverb (reverberation sound).

The on-air switch 26 is a switch for instructing the PC 10 to output in real time via the Internet. By the user operating the on-air switch 26 to the ON state, for example, the audio signal which is input from the microphone input terminal 16 can be output to the Internet from the PC 10, or by the user operating the "immediate output 1," the audio file assigned in advance to the "immediate output 1" may be reproduced and output to the Internet.

Figure 2:
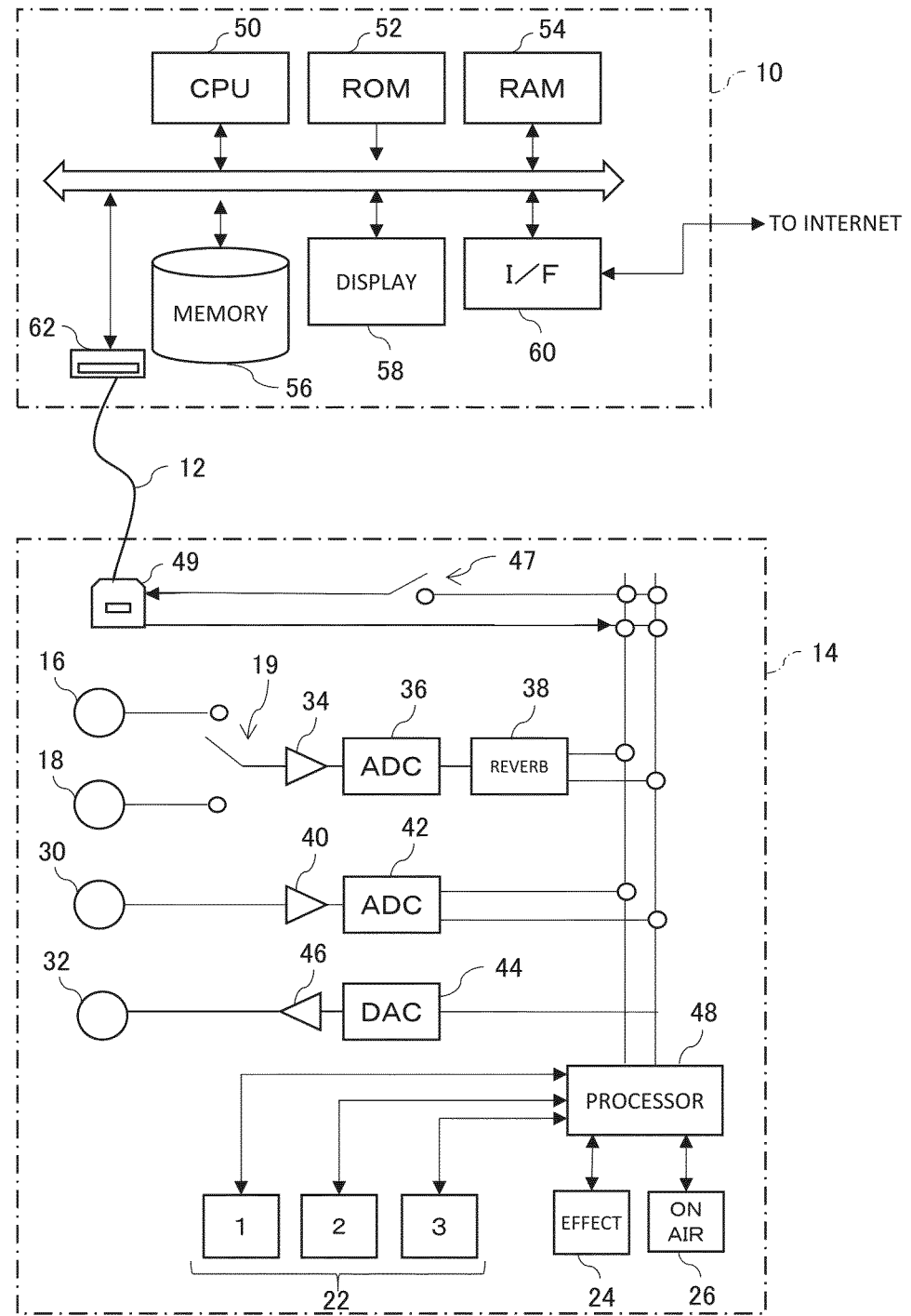
FIG. 2 is a structural block diagram of the embodiment of the present disclosure.

FIG. 2 is a structural block diagram of an audio system according to the present embodiment.

The PC 10 includes a CPU 50, a ROM 52, a RAM 54, a memory 56, a display 58, a communication interface I/F 60, and a USB connector 62. In addition, the PC 10 comprises a known input/output interface such as a mouse and a keyboard.

The CPU 50 realizes various functions of the present embodiment by reading a processing program stored in the ROM 52 or a hard disk drive or the like, and executing the processing program using the RAM 54 as a working memory.

The memory 56 stores the audio file and other files. A format of the audio file is arbitrary, and may be, for example, WAV or MP3. The other files are also arbitrary, and may be document data, image data, or video data.

The display 58 displays various information based on a control instruction from the CPU 50. In the present embodiment, in order to cooperate with the audio interface apparatus 14, the display 58 displays virtual switches corresponding to the switches of the audio interface apparatus 14; more specifically, the immediate output switch 22, the effect switch 24, and the on-air switch 26.

The communication I/F 60 is an interface for connecting to the Internet serving as the communication line. The connection to the Internet may be either wired or wireless.

The USB connector 62 is a connector for USB-connecting with the audio interface apparatus 14. In the drawings, there is schematically shown a connection with a USB connector 49 on the side of the audio interface apparatus 14 via the USB cable 12.

The CPU 50 functions as a first controller of the system, and assigns in advance audio files desired by the user to the three switches of the immediate output switch 22, in response to the user operation. Specifically, the CPU 50 associates, in response to the user operation, one of the files stored in the memory 56 and one of the switches of the immediate output switch 22. For example, an audio file of "AAA.WAV" stored in the memory 56 is associated with the "immediate output 1," and an audio file of "BBB.WAV" is associated with the "immediate output 2." The description of "association" specifically means registration of a path of the audio file with the "immediate output 1." The user causes the display to display, for example, a list of files stored in the memory 56, and can assign (associate) the file and the switch by dropping, with a drag-and-drop operation or the like, a desired audio file icon to a virtual switch corresponding to the immediate output switch 22. The CPU 50 judges, in the assignment by the user operation, whether or not the audio file assigned to the immediate output switch 22 is normally assigned.

Here, the description of "normally assigned" means that the audio file is an audio file of a format that can be reproduced by the PC 10 and that there is no data damage or the like and the audio file can be actually reproduced. In addition, the description of "abnormally assigned" (or not normally assigned) means that the audio file is an audio file of a format that cannot be reproduced by the PC 10 or that, although the audio file is in the format that can be reproduced by the PC 10, there is data damage or the like and the audio file cannot actually be reproduced.

The CPU 50 judges whether or not the audio file is normally assigned when the file is assigned to the immediate output switch 22 by the user operation, and displays a judgment result as an assignment state on the display 58, to notify the user. The assignment state includes at least the judgment result of normal/abnormal, and when the state is normal, the assigned file name may be included.

The CPU 50 further supplies the data indicating the assignment state to the audio interface apparatus 14 which is USB-connected. With such a configuration, the assignment state is shared between the PC 10 and the audio interface apparatus 14.

The audio interface apparatus 14 comprises, in addition to the microphone input terminal 16, the built-in microphone 18, the immediate output switch 22, the effect switch 24, and the on-air switch 26 described above, an external input terminal 30, an output terminal 32, switching switches 19 and 47, amplifiers 34, 40, and 46, analog-to-digital converters (ADC) 36 and 42, a digital-to-analog converter (DAC) 44, a reverb adder (REVERB) 38, and a processor 48.

An audio signal which is input from the microphone input terminal 16 and the built-in microphone 18 is selectively switched by the switching switch 19, supplied via the amplifier 34, and converted into a digital audio signal by the ADC 36. To the digital audio signal, reverb is suitably added by the reverb adder 38 according to an operation of the effect switch 24 by the user, and the resulting digital audio signal is output to a stereo bus. In addition, an audio signal which is input from the external input terminal (AUX IN) 30 is supplied via the amplifier 40, converted into a digital audio signal by the ADC 42, and output to the stereo bus.

The audio signal which is input from the microphone input terminal 16, the built-in microphone 18, and the external input terminal 30, or the audio signal which is supplied from the PC 10 is supplied via the stereo bus, converted into an analog audio signal by the DAC 44, and output from the output terminal 32 such as a headphone terminal via the amplifier 46. A gain of the amplifier 46 is adjusted by the headphone output adjustment button 28.

The USB connector 49 for connection with the PC 10 is connected to the stereo bus via the switching switch 47. The switching switch 47 is linked with the on-air switch 26. When the on-air switch 26 is operated ON, a connection point is set to the ON state, and the output of the audio signal from the audio interface apparatus 14 to the PC 10 is started. On the other hand, regardless of the operation of the on-air switch 26, the control signal from the PC 10 to the audio interface apparatus 14 is supplied to the processor 48.

The processor 48 functions as a second controller of the system, and controls operations of various parts of the audio interface apparatus 14. The processor 48 controls the operation according to operation signals from the immediate output switch 22, the effect switch 24, and the on-air switch 26. Specifically, the processor 48 outputs the reproduction instruction signal to the PC 10 in response to the operation signal from the immediate output switch 22. When the "immediate output 1" of the immediate output switch 22 is operated, the reproduction instruction signal for "immediate output 1" is output; when the "immediate output 2" is operated, the reproduction instruction signal for "immediate output 2" is output; and when the "immediate output 3" is operated, the reproduction instruction signal for "immediate output 3" is output. The CPU 50 of the PC 10, upon receiving the reproduction instruction signal, reproduces and outputs an audio file assigned to the "immediate output 1," the "immediate output 2," or the "immediate output 3" in advance. In addition, the CPU 50 operates the reverb adder 38 in response to the operation signal from the effect switch 24, to add the reverb. Moreover, in response to the operation signal from the on-air switch 26, the CPU 50 outputs to the PC 10 a signal output start (broadcast start) instruction signal or a signal output stop (broadcast stop) instruction signal, and controls switching ON/OFF of the switching switch 47.

The processor 48 receives data indicating the judgment result of the assignment supplied from the PC 10 via the USB cable 12, the USB connector 49, and the bus, and controls a display form of the immediate output switch 22 based on the data indicating the judgment result of assignment. The display form includes existence/absence of the assignment of the audio file, and, if an audio file is assigned, judgment result of normal/abnormal. For example, the PC 10 judges whether or not the assignment by the user operation is normal, and, if the states are such that an audio file is normally assigned for the "immediate output 1," an audio file is abnormally assigned for the "immediate output 2," and no audio file is assigned for the "immediate output 3," these pieces of information are supplied from the PC 10 to the processor 48 as data indicating the assignment state. Based on these pieces of information, the processor 48 lights the "immediate output 1," causes the "immediate output 2" to blink, and does not light the "immediate output 3."

The user can reproduce a desired audio file and output the audio file to the Internet by operating the immediate output switch 22 of the audio interface apparatus 14. During this process, the user can visually check the display form of the immediate output switch, to easily check whether or not an audio file is assigned to each switch of the immediate output switch, and whether or not the assignment is normal.

<Assignment of Audio File>

Figure 3:
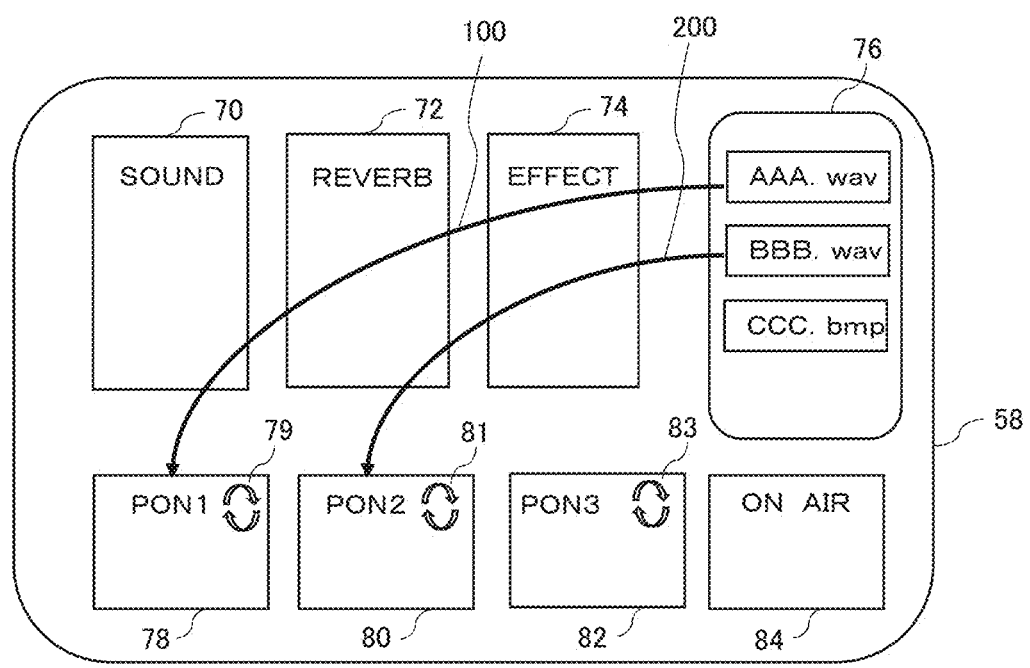
FIG. 3 is an explanatory diagram of an audio file assignment according to the embodiment of the present disclosure.

FIG. 3 is a schematic diagram showing a process when the user assigns a desired audio file to the immediate output switch 22 on the PC 10.

The CPU 50 of the PC 10 executes a processing program to display a screen shown on FIG. 3 on the display 58. Virtual switches 78, 80, and 82 corresponding to the three switches of the physical immediate output switch 22 of the audio interface apparatus 14, the "immediate output 1," the "immediate output 2," and the "immediate output 3," respectively, are displayed on the screen, and a virtual switch 84 corresponding to the physical on-air switch 26 of the audio interface apparatus 14 is also displayed on the screen. Icons 79, 81, and 83 at top right of the virtual switches 78, 80, and 82, respectively, are icons for instructing repeated reproduction (repeat) of the assigned audio file. In addition, display units 70, 72, and 74 for displaying the sound volume (weak talk, strong talk, weak singing, strong singing, etc.), the reverb, and the effects (other than reverb) are displayed. Further, a list 76 of various files stored in the memory 56 is displayed. The file list 76 may be a list displayed on Windows Explorer (registered trademark).

The user selects, among the group of files displayed in the file list 76, a file to be assigned to the immediate output switch 22, and executes the drag-and-drop operation to assign the file to one of the virtual switches 78~82. Alternatively, a configuration may be employed in which, by pressing the virtual switches 78~82, a file selection screen (such as a tree screen similar to the file list 76 and the explorer) is displayed.

For example, when the audio file "AAA.wav" is to be assigned to the "immediate output 1," the audio file "AAA.wav" is dragged-and-dropped to the virtual switch 78 corresponding to the "immediate output 1." In the figure, an arrow 100 shows the drag-and-drop operation of the audio file "AAA.wav" to the virtual switch 78. Similarly, when the audio file "BBB.wav" is to be assigned to the "immediate output 2," the audio file "BBB.wav" is dragged-and-dropped to the virtual switch 80 corresponding to the "immediate output 2." In the figure, an arrow 200 shows the drag-and-drop operation of the audio file "BBB.wav" to the virtual switch 80.

When a file is assigned by the drag-and-drop operation in this manner, the CPU 50 judges whether or not the assignment is normal, and displays the result of the judgment on the display 58.

<Display on PC 10>

Figure 4:
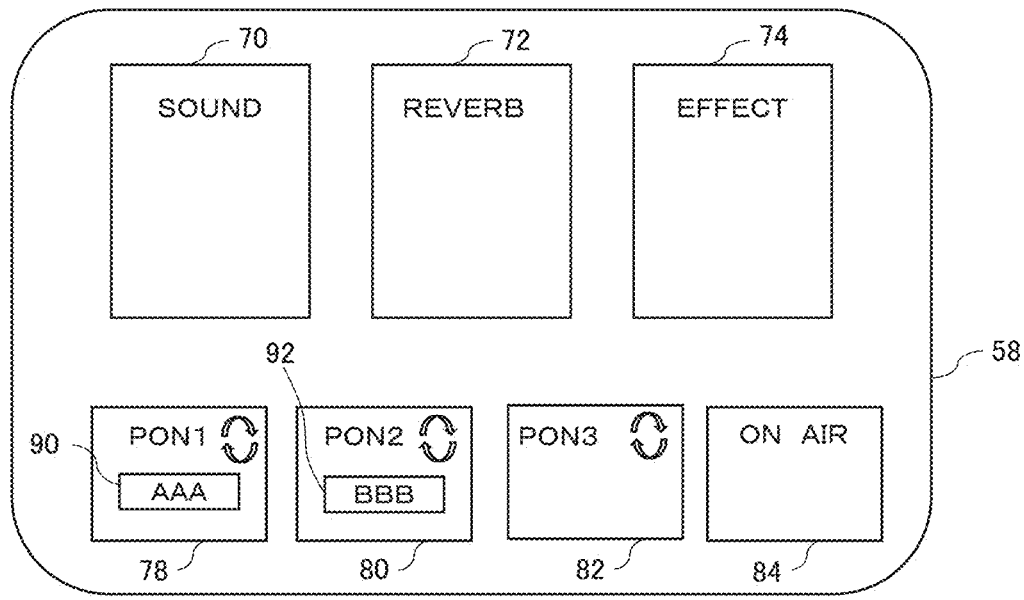
FIG. 4 is an explanatory diagram of a display of a computer for normal assignment according to the embodiment of the present disclosure.

FIG. 4 shows an example display form of the display 58 when the assignment is normal. A name 90 of the audio file assigned, "AAA," is displayed on the virtual switch 78, and a name 92 of the audio file assigned, "BBB," is displayed on the virtual switch 80. The virtual switches 78 and 80 may be displayed with a color different from an ordinary color (for example, the color may be blue whereas the color in the ordinary case is white), or may be displayed with an increased brightness. The virtual switch 82 to which no audio file is assigned is displayed with the ordinary color and the ordinary brightness.

Figure 5:
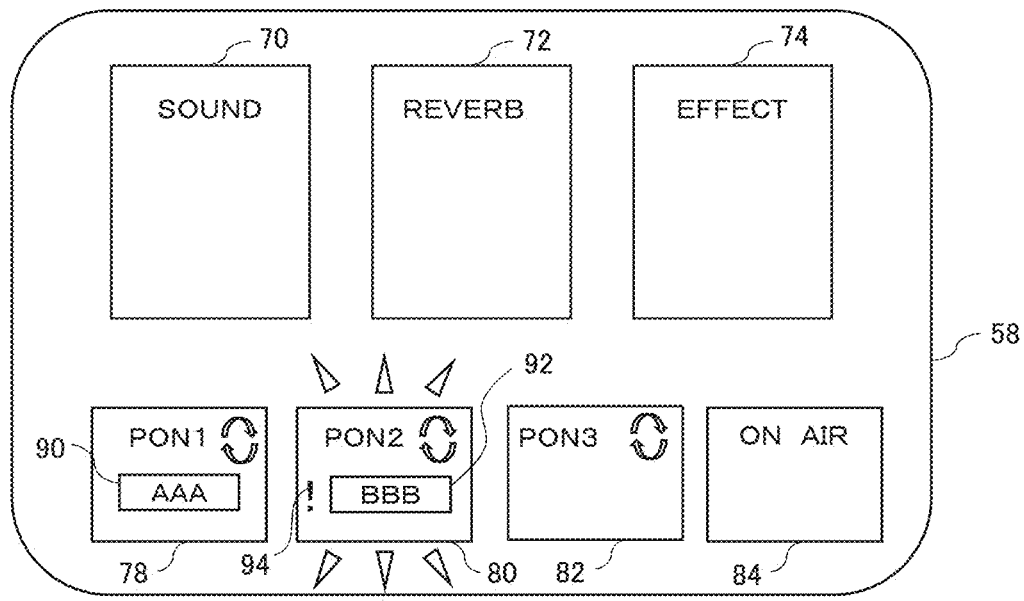
FIG. 5 is an explanatory diagram of a display of a computer for abnormal assignment according to the embodiment of the present disclosure.

FIG. 5 shows an example display form of the display 58 when the assignment is abnormal. When the extension of the audio file "BBB.wav" is rewritten and the file is not in principle an audio file, or when the file is an audio file but is not actually reproducible, the CPU 50 displays the virtual switch 80 with a color different from the ordinary color (for example, in red whereas the file in the ordinary case is displayed with blue). In addition, in order to call the user's attention, the virtual switch 80 may be displayed in a blinking manner, or a "!" symbol 94 may be displayed. The user can visually check such a display to see, before actually operating the immediate output switch 22, that while the audio file "AAA" is normally assigned to the "immediate output 1," there is an abnormality in the assignment of the "immediate output 2" and immediate output is not possible, and that no audio file is assigned to the "immediate output 3."

The CPU 50 displays the judgment result of the normality/abnormality of the assignment on the display 58, and also supplies the judgment result to the processor 48 of the audio interface apparatus 14, to share the judgment result between the PC 10 and the audio interface apparatus 14. The immediate output of the assigned audio file is ordinarily executed by the user operating the immediate output switch 22 of the audio interface apparatus 14, but alternatively, the immediate output may be realized by the user clicking on the virtual switches 78, 80, and 82 on the PC 10 with a mouse, or the like.

<Display on Audio Interface Apparatus 14>

Figure 6:
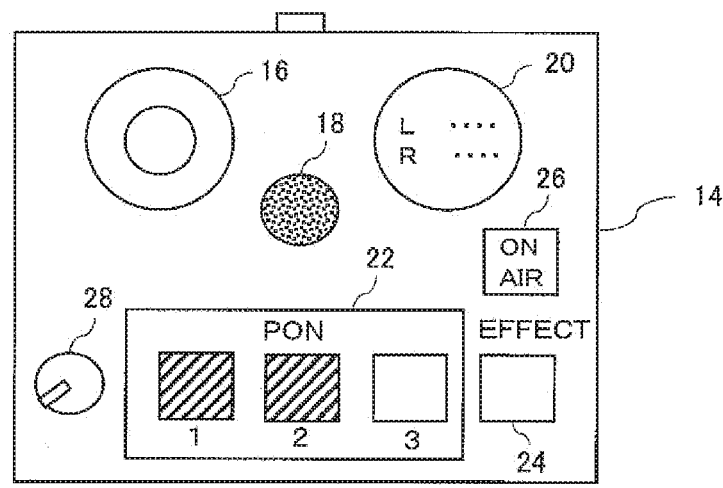
FIG. 6 is an explanatory diagram of an audio interface apparatus for normal assignment according to the embodiment of the present disclosure.

FIG. 6 shows an example display form of the immediate output switch 22 of the audio interface apparatus 14 when the assignment is normal. The "immediate output 1" and the "immediate output 2" are lighted, and the "immediate output 3" to which no file is assigned remains unlighted. Alternatively, the "immediate output 1" and the "immediate output 2" may be displayed with a color different from ordinary, for example, in blue.

Figure 7:
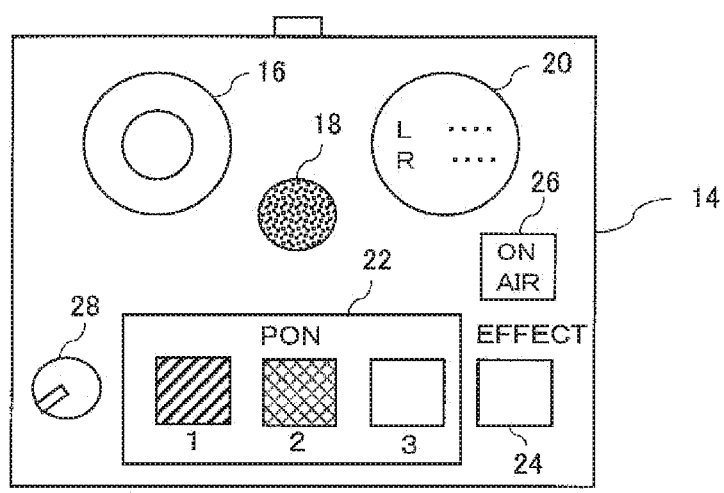
FIG. 7 is an explanatory diagram of an audio interface apparatus for abnormal assignment according to the embodiment of the present disclosure.

FIG. 7 shows an example display form of the immediate output switch 22 of the audio interface apparatus 14 when the assignment is abnormal. When the extension of the audio file "BBB.wav" is rewritten and the file is in principle not an audio file, or when the file is an audio file but is not actually reproducible, the "immediate output 2" is lighted with a color different from the color of the ordinary case, for example, in red. Alternatively, the "immediate output 2" may be displayed in a blinking manner. The user can visually check such a display to see in advance before actually operating the immediate output switch 22 that, while an audio file is normally assigned to the "immediate output 1," the assignment of the "immediate output 2" is abnormal, and the immediate output cannot be executed, and that no audio file is assigned to the "immediate output 3."

FIGS. 4~7 exemplify display forms for normal and abnormal cases at the PC 10 and the audio interface apparatus 14. Alternatively, other arbitrary display forms are possible, so long as the states are displayed in a form to allow identification of three states including a normal assignment state, an abnormal assignment state, and a no assignment state.

<Process Flowchart>

Figure 8:
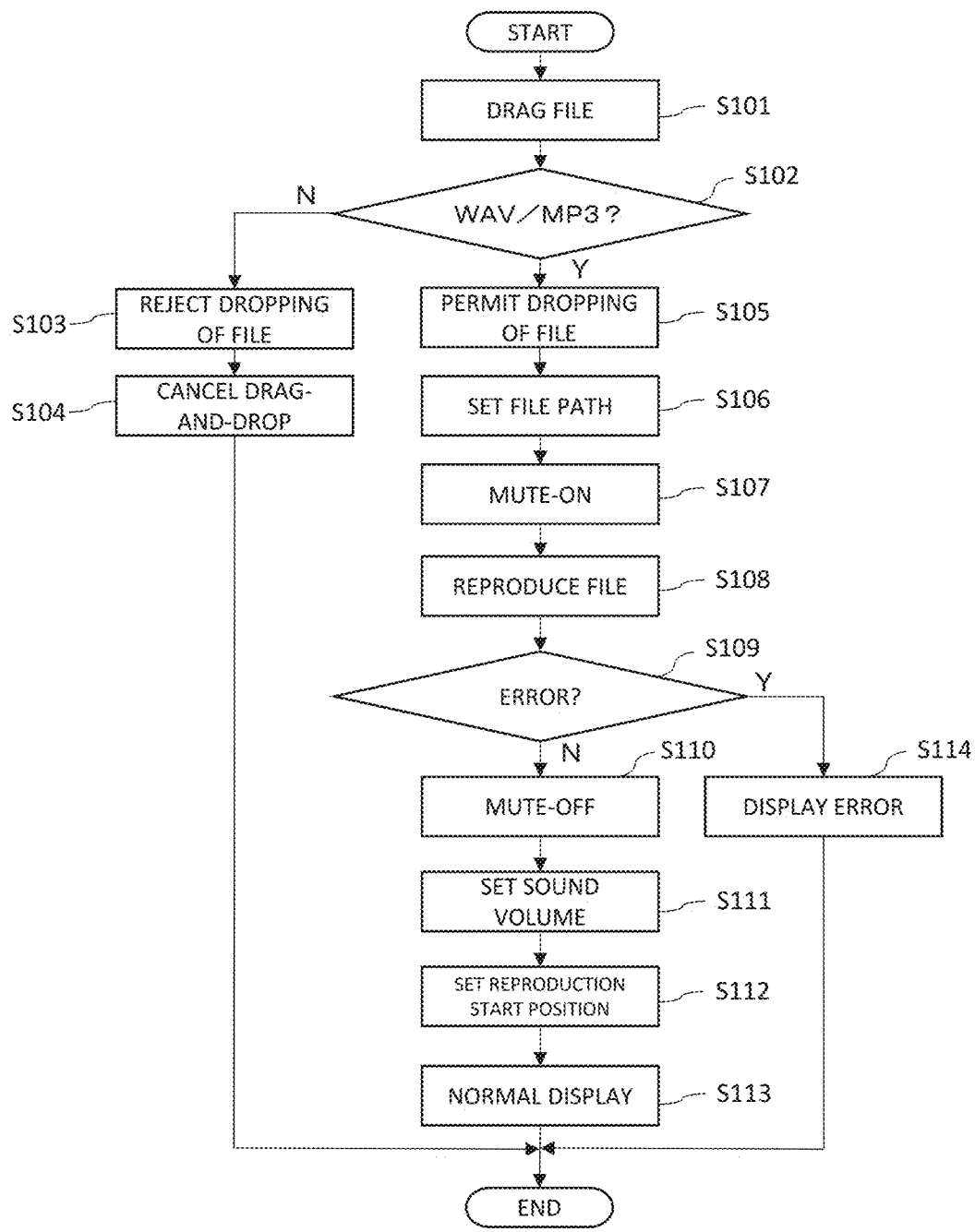
FIG. 8 is a process flowchart of the embodiment of the present disclosure.

FIG. 8 shows a process flowchart during assignment of the audio file in the present embodiment.

The user first operates the PC 10 to cause the CPU 50 to display the screen as shown in FIG. 3 on the display 58, selects a desired file from the file list 76, and drag-and-drops the file (S101). For example, the user may drag-and-drop the "BBB.wav" file to the virtual switch 80 corresponding to the "immediate output 2."

The CPU 50 first judges whether or not a file format of the drag-and-dropped file is a format compatible with a predetermined music reproduction software (S102). For example, when the music reproduction software is compatible with WAV or MP3, the CPU 50 judges whether or not the file format is either of these formats. The judgment of the file format is desirably executed simply by judging whether or not the extension of the audio file is compatible with WAV or MP3. When the file format of the drag-and-dropped file is other than WAV or MP3 (for example, when "CCC.bmp" is dragged-and-dropped) (NO in S102), the CPU 50 rejects dropping of the file (S103), and cancels the drag-and-drop operation (S104). In this case, the assignment to the immediate output switch 22 is not executed. In this process, the CPU 50 may display an error message on the display 58 such as "wrong file format," to notify the user. Alternatively, the CPU 50 may set the display state of the virtual switch 80 for which dropping of the file is rejected to the abnormal display for a predetermined period (period to allow the user to recognize).

When the file format of the drag-and-dropped file conforms with the format of the music reproduction software (YES in S102), the CPU 50 permits dropping of the file (S105), and sets a file path for associating the dropped file and the immediate output switch 22 corresponding to the virtual switch (S106). For example, when "BBB.wav" is dropped to the virtual switch 80, the CPU 50 sets a file path for reading "BBB.wav" to the "immediate output 2" corresponding to the virtual switch 80.

Next, the CPU 50 judges whether or not the associated audio file can be actually reproduced. Specifically, the CPU 50 sets a sound device of the PC 10 to a mute-ON state (S107), and reproduces the audio files assigned to the virtual switches 78, 80, and 82 (S108). This reproduction does not need to be executed at a standard rate, and may be executed at a rate of double speed or greater. The CPU 50 judges whether or not an error is caused during the reproduction (S109).

When no error is caused during reproduction, the CPU 50 sets the mute of the sound device of the PC 10 to an OFF state (S110), sets the sound volume (S111), sets a reproduction start position (S112), and displays the virtual switches 78, 80, and 82 in the normal state (S113).

On the other hand, when an error is caused during the reproduction, the CPU 50 displays the abnormal state for the virtual switch, among the virtual switches 78, 80, and 82, for which abnormality is found (S114). Because the CPU 50 also supplies the judgment result to the audio interface apparatus 14, in the audio interface apparatus 14 also, the normal display or the abnormal display of the immediate output switch 22 is executed corresponding to the normal display of S113 or abnormal display of S114.

It takes a certain period of time from the start of reproduction in S108 to the judgment of whether or not an error is caused in S109. During this period, a normal display may be displayed assuming that the file is normally assigned, or a third display form different from normal/abnormal may be employed; that is, it is also possible to display that the state is currently being judged.

An embodiment of the present disclosure has been described. The present disclosure, however, is not limited to the embodiment, and various modifications may be made.

For example, in the present embodiment, an audio file is assigned to the immediate output switch 22, but alternatively, an audio file may be assigned also to the on-air switch 26. The user may assign an audio file to the on-air switch 26 by drag-and-drop operating a desired audio file to the virtual switch 84 corresponding to the on-air switch 26, similar to the assignment of audio files to the "immediate output 1," the "immediate output 2," and the "immediate output 3" by drag-and-drop operating audio files to the virtual switches 78, 80, and 82 in FIG. 3. In this case also, the CPU 50 judges whether or not the assignment is normal, displays the judgment result on the display 58 and supplies the judgment result to the audio interface apparatus 14, and the processor 48 notifies the judgment result to the user by changing the display form of the on-air switch 26. Similar to the assignment for the immediate output switch 22, the judgment result is one of normal, abnormal, and no assignment. When the assignment is normal, the CPU 50 of the PC 10 reproduces the assigned audio file in response to an OFF-operation of the on-air switch 26, and sends a predetermined sound to the Internet. Specifically, when the user OFF-operates the on-air switch 26, the switching switch 47 is switched OFF accordingly, and in this process, the processor 48 outputs a reproduction start instruction signal for a particular sound to the PC 10. In response to the reproduction start instruction signal, the CPU 50 reproduces and outputs the audio file which is assigned in advance. The predetermined sound is, for example, sound such as "currently, there is no broadcast on-air." When the audio file is assigned to the on-air switch 26, the processor 48 may set the display color of the on-air switch 26 to a particular color.

In addition, in the present embodiment, the CPU 50 may store, in the ROM 52 or the memory 56, the past audio files assigned to the "immediate output 1," the "immediate output 2," and the "immediate output 3"; that is, history information of the assignment, and may suitably display the history information on the display 58 in response to a user operation. Specifically, when the user moves a cursor of the mouse over the virtual switch 78, the assignment history of the virtual switch 78; that is, the "immediate output 1," is displayed. The user can visually check the history displayed in a pull-down menu form, and select a particular audio file in the history, so that the user can newly assign the audio file in this manner in place of the drag-and-drop operation. When the CPU 50 stores the history information for each immediate output switch, desirably, the CPU 50 only stores the audio file whose assignment was judged by the CPU 50 as normal. For example, when the audio files assigned in the past and the judgment result thereof are as follows, with ○ representing normal and x representing abnormal:

"aaa.mp3"→○;
"bbb.mp3"→x;
"ccc.wav"→○, the history is stored with "bbb.mp3" being deleted from the history information. Alternatively, the CPU 50 may display a particular display for the file judged as having abnormal assignment, to call attention of the user. The history information may be a common display in place of the display for each virtual switch (immediate output switch), or may be in a form that the individual display and the common display can be switched by setting.

Moreover, in the present embodiment, the judgment result of assignment at the PC 10 is shared between the PC 10 and the audio interface apparatus 14, but alternatively, the result may be shared with the audio interface apparatus 14 only when the PC 10 judges that the assignment is normal. In this case, the processor 48 of the audio interface apparatus 14 displays, in an identifiable manner, two states of "normal" and "no assignment." Here, "abnormal" can be considered to be included in "no assignment."

Further, in the present embodiment, the PC 10 and the audio interface apparatus 14 are USB-connected by the USB cable 12, but the connection form is not limited to this, and may be wired or wireless. Thus, the PC 10 and the audio interface apparatus 14 may be connected via Wi-Fi (registered trademark), Bluetooth (registered trademark), or the like. The signals transmitted and received between the PC 10 and the audio interface apparatus 14 include: the judgment result signal of assignment, the immediate output signal (reproduction start instruction signal), the audio signal, and the on-air signal (broadcast start and stop instruction signals), and any arbitrary connection form that allows transmission and reception of these signals may be employed.

The invention claimed is:

1. An audio apparatus that is connected to a computer, the audio apparatus comprising:
   an operation switch that outputs to the computer, a reproduction start instruction signal of an audio file which is assigned to the operation switch in advance;
   a receiver that receives, from the computer, a result of a judgment, performed by the computer, of whether or not an error is caused during a prior reproduction of the audio file that is performed in response to the audio file being assigned to the operation switch in advance; and a processor that notifies the result of the judgment using the operation switch based on the result of the judgment received by the receiver, wherein, when the result of the judgment performed by the computer is that no error is caused during the prior reproduction of the audio file, the processor causes the operation switch to be displayed in a first display state, and wherein, when the result of the judgment performed by the computer is that the error is caused during the prior reproduction of the audio file, the processor causes the operation switch to be displayed in a second display state, the second display state being different from the first display state.

2. The audio apparatus according to claim 1, wherein the processor notifies the result of the judgment as a change of a display form including at least one of a display color and a display brightness of the operation switch.

3. The audio apparatus according to claim 2, wherein the result of the judgment includes a normal result or a no assignment result, and the processor controls the display form of the operation switch to indicate the normal result or the no assignment result in an identifiable manner.

4. The audio apparatus according to claim 1, further comprising:

an on-air switch that outputs, to the computer, a switching signal that indicates whether or not a second audio file is to be output on-air, and that outputs, to the computer, a reproduction start instruction signal of the second audio file which is assigned to the on-air switch in advance when the audio file is not to be output on-air, wherein the receiver receives, from the computer, a result of a second judgment, performed by the computer, of whether or not an error was causes during a prior reproduction of the second audio file which is assigned to the on-air switch in advance, and the processor notifies the result of the second judgment using the on-air switch based on the result of the second judgment received by the receiver.

5. An audio system, comprising:

a computer that is connected to a communication line; and an audio apparatus that is connected to the computer and that comprises an operation switch that outputs, to the computer, a reproduction start instruction signal of an audio file which is assigned to the operation switch in advance, wherein:

the computer comprises:

a display; and a first processor that displays, on the display, a virtual switch corresponding to the operation switch, that performs a judgment whether or not an error is caused during reproduction of the audio file in response to the audio file being assigned to the virtual switch, that displays a result of the judgment using the virtual switch, and that supplies the result of the judgment to the audio apparatus, and the audio apparatus comprises:

a receiver that receives the result of the judgment supplied from the first processor; and a second processor that notifies the result of the judgment using the operation switch based on the result of the judgment received by the receiver, wherein, when the result of the judgment performed by the computer is that no error is caused during a prior reproduction of the audio file, the second processor causes the operation switch to be displayed in a first display state, and wherein, when the result of the judgment performed by the computer is that the error is caused during the prior reproduction of the audio file, the second processor causes the operation switch to be displayed in a second display state, the second display state being different from the first display state.

6. The audio system according to claim 5, wherein the second processor notifies the result of the judgment as a change of a display form including at least one of a display color and a display brightness of the operation switch.

7. The audio system according to claim 6, wherein the result of the judgment includes a normal result or a no assignment result, and the second processor controls the display form of the operation switch to indicate the normal result or the no assignment result in an identifiable manner.

* * * * *